Aug. 17, 1926.

W. S. GREEN 1,596,525

FINISHING DEVICE FOR BRONZE BACK BEARINGS OR THE LIKE

Filed March 6, 1924   2 Sheets-Sheet 1

Inventor:
William Stanley Green,
Munday, Clarke & Carpenter
Attys.

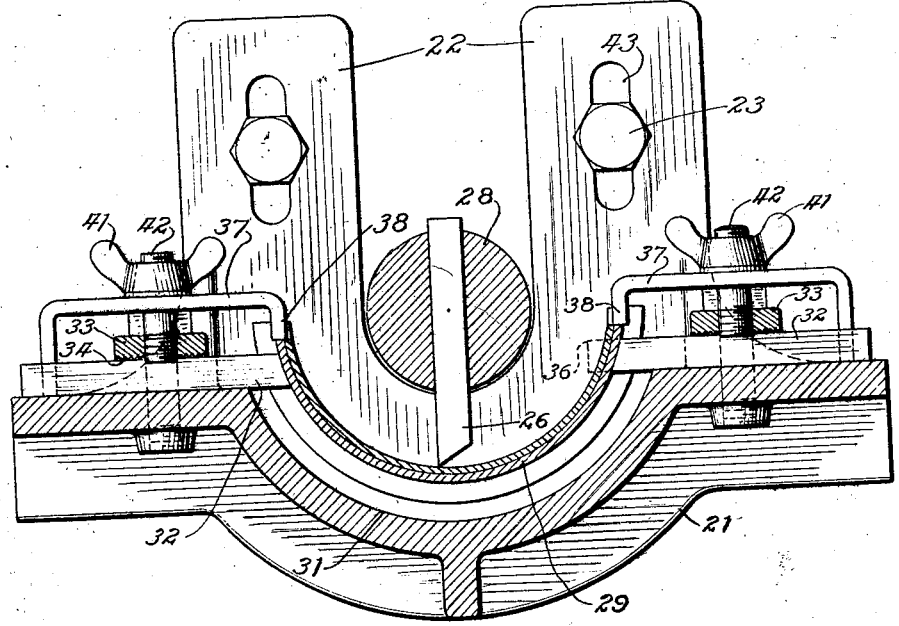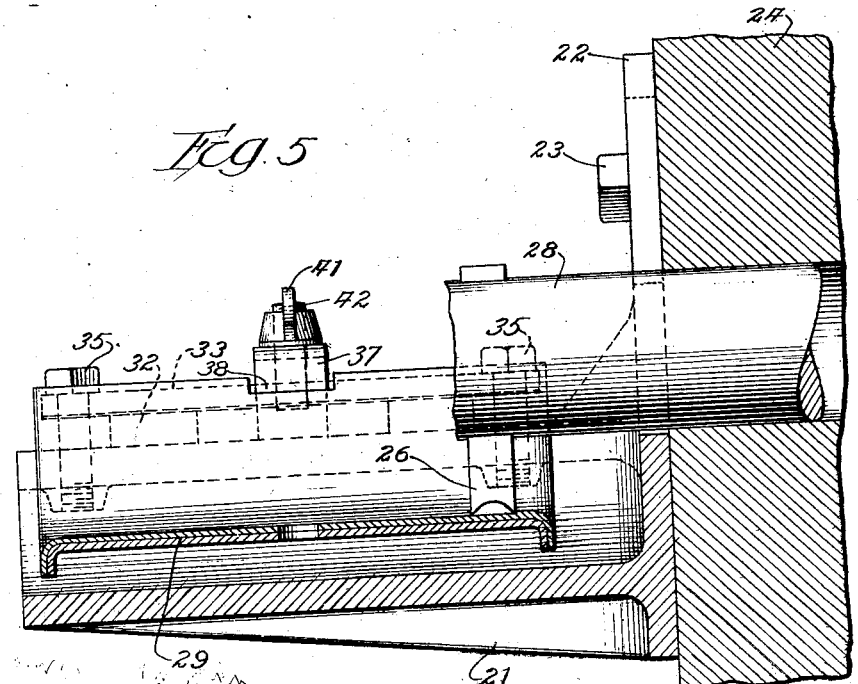

Patented Aug. 17, 1926.

1,596,525

UNITED STATES PATENT OFFICE.

WILLIAM STANLEY GREEN, OF HOOPESTON, ILLINOIS.

FINISHING DEVICE FOR BRONZE-BACK BEARINGS OR THE LIKE.

Application filed March 6, 1924. Serial No. 697,194.

My present invention relates to a device for finishing bearings, particularly of the bronze back type, and has for a primary object the provision of means for aligning the bearing and supporting it in accurate relationship with respect to a rotary scraping tool.

An important object of the invention is the provision of an attachment for boring machines, which are primarily adapted for finishing connecting rod bearings, which attachment renders possible the finishing of bronze back, or split bearings in accurate and efficient manner.

Another object is the provision of a device for the purpose stated in which the parts which directly support the bearing are formed of relatively soft material, such as a soft metal alloy, and are adapted to be cut down by the finishing tool itself to provide supporting surfaces concentric with the axis of rotation of said tool.

Numerous other objects and advantages of the invention will be apparent as it is better understood from the following description, which, taken in connection with the accompanying drawings, discloses a preferred embodiment thereof.

Referring to the drawings,

Fig. 4 is an enlarged sectional and elevational view, taken transversely of the device with a bearing clamped in position for operation thereon; and Fig. 5 is a longitudinal section of said parts on the same scale.

Figure 1:
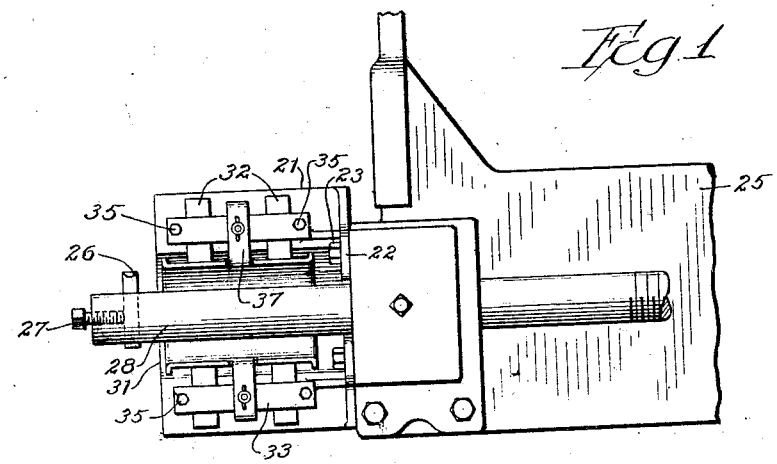
Figure 1 is a plan view of an end of a boring machine equipped with the device of my invention.
Figure 2:
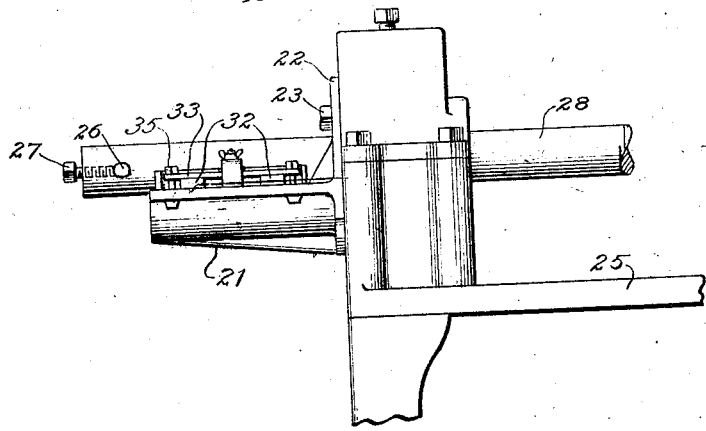
Fig. 2 is a side elevation thereof.
Figure 3:
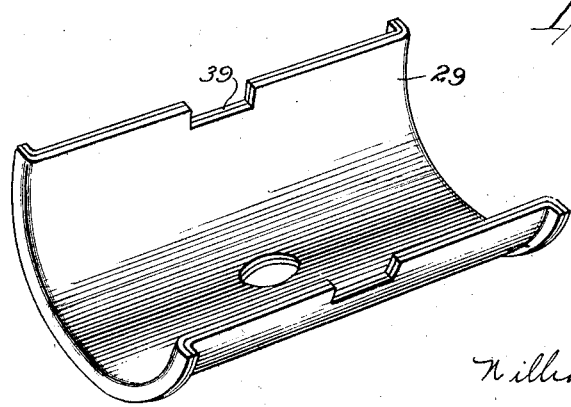
Fig. 3 is an enlarged perspective view of a bronze back bearing of the type adapted to be finished by the apparatus of my invention.

As thus illustrated, the device comprises a bracket 21 which may be cast and is provided with a vertical U-shaped part 22 adapted to be attached by means of bolts 23 to an end part 24 of the boring machine frame 25, said bracket being provided with supporting and clamping devices to be hereinafter more fully described. It should be understood that the frame 25 forms a part of a boring machine for connecting rod bearings, such as that described in my copending application, Serial No. 675,514, and that the device of my present invention constitutes an attachment which may be applied to the machine when it is desired to finish bronze back bearings, or the like, instead of connecting rod bearings.

A cutter 26 is adjustably held by means of a screw 27 in a slot in the end of a cutter bar 28, which latter has bearings in the frame and is adapted to be rotated by hand, or otherwise, to operate the cutter. For the purpose of centering the bearing, which I have designated by the reference character 29, with reference to the axis of the cutter bar 28, I employ devices which will now be described.

The main bracket, or support, 21 is formed with a concave central portion 31 in which the bearing 29 is adapted to be disposed and I provide adjustable bars 32, of babbitt or other soft alloy, for supporting said bearing in accurate relationship with respect to the cutter. Longitudinal clamping bars 33, preferably provided with serrated under faces 34, are adapted to be tightened upon the bars 32 by means of screws 35 to hold said bars in adjusted position. For the purpose of shaping the inner ends of the bars 32 so that they will be concentric with the cutter bar 28, said bars are positioned with their inner ends protruding far enough within the concave portion 31 of the bracket 21 so that the cutter 26 may take a light cut therefrom when said cutter bar is rotated. The amount of metal cut away need not be very great and, of course, is determined by the position of the bars 32 and the extent of projection of the cutter 26. For purposes of illustration, I have shown in dotted lines in Fig. 4, as indicated at 36, the inner end of one of the bars 32 prior to its being cut down to provide a seat for the bearing, though it will be obvious that it is not always necessary to cut away as much of the material as is here indicated. The dimensions of the bearing, of course, may be accurately known and the cutter 26 set in such manner as to provide a properly spaced and shaped supporting surface and the cutter may then be adjusted in such manner as to suitably finish the lining on the interior of the bearing. For the purpose of clamping said bearing in operative relationship to the cutter, I employ clamps 37 extending up from the outer portions of the support 21 and inwardly to a point above the edges of the bearing, the inner down-turned ends 38 of said clamps being adapted to enter recesses 39 in the edge of the bearing and to be clamped thereagainst by means of wing nuts 41 threaded upon studs 42 extending through said clamps 37 and into the bars 33.

The bolts 23 extend through slots 43 in the U-shaped part of the casting 21 and in this manner, said casting may be vertically adjusted with respect to the cutter bar 28.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. Means for finishing bronze back bearings or the like, comprising a rotatable cutting tool, and means for supporting the bearing in operative relation to said tool, said means including a rigid support, bars of soft metal arranged on substantially radiating lines whose combined cross-section is substantially less than the arc they intersect, means for adjustably but rigidly holding said bars with their adjacent free spaced ends exposed so that they may be cut down by the cutting tool to provide an accurately spaced seat for the bearing.

2. Means for finishing bronze back bearings or the like, comprising a cutting tool, means for supporting the bearing in operative relation to said tool, said means including a rigid support and a plurality of members arrangeable upon said support and being of relatively soft material, said members being adapted to be cut down by said cutting tool to form concentric seat portions for the back of the bearing and being substantially less in combined cross-section than the area of said back, the latter being relatively rigid and having a soft lining thereby providing a rigid support for said lining during the cutting operation on the latter.

3. Means for finishing bronze back bearings or the like, comprising a boring machine frame, a removable bracket adapted to be rigidly secured to said frame, a cutting tool operatively mounted in said frame, and means for supporting a bronze back bearing or the like upon said bracket in operative relation to said tool, said means comprising a plurality of soft metal bars arranged on substantially radiating lines with respect to the bearing member when in position and being substantially less in combined cross-section than the outer surface of the bearing, and means for adjustably but rigidly holding said bars upon said bracket with their inner spaced ends exposed so that the latter may be cut down by said cutting tool to provide an accurately spaced seat for the bearing.

4. Means for finishing bronze back bearings or the like, comprising a frame, a cutting element operatively mounted therein, and means for supporting the bearing in operative relation to said tool, said means comprising a rigid support of substantially arcuate form, a plurality of soft metal bars extending into the arc of said support and of substantially less area in combined cross-section than said arc, and releasable means for clamping said bars in desired position, the inner ends of said bars being adapted to be cut down to provide spaced seat portions for said bearing.

5. Means for finishing bronze back bearings or the like, comprising a frame, a cutting element operatively mounted therein, and means for supporting the bearing in operative relation to said tool, said means comprising a rigid support of substantially arcuate form, a plurality of soft metal bars extending into the arc of said support and of substantially less area in combined cross-section than said arc, releaseable means for clamping said bars in desired position, the inner ends of said bars being adapted to be cut down to provide spaced seat portions for said bearing, and means for clamping said bearing into the seat thus formed by said bars.

6. Means for finishing bronze back bearings or the like, comprising a frame, a cutting element operatively mounted therein, and means for supporting the bearing in operative relation to said tool, said means comprising a rigid support, a plurality of soft metal bars carried by said support and being of substantially less area in combined cross-section than the area of the back of the bearing, releaseable means for clamping said bars in desired position, the inner ends of said bars being adapted to be cut down to provide spaced seat portions for said bearing, and means for clamping said bearing into the seat thus formed by said bars.

WILLIAM STANLEY GREEN.